(12) United States Patent
Shim et al.

(10) Patent No.: US 11,687,214 B2
(45) Date of Patent: Jun. 27, 2023

(54) METHOD AND APPARATUS FOR CHANGING SCREEN IN ELECTRONIC DEVICE

(71) Applicant: Samsung Electronics Co., Ltd., Suwon-si (KR)

(72) Inventors: Hyeongseop Shim, Daegu (KR); Hyesoon Jeong, Chilgok-gun (KR); Daesik Hwang, Daegu (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/476,974

(22) Filed: Sep. 16, 2021

(65) Prior Publication Data
US 2022/0004292 A1    Jan. 6, 2022

Related U.S. Application Data

(63) Continuation of application No. 16/384,306, filed on Apr. 15, 2019, now Pat. No. 11,137,881, which is a
(Continued)

(51) Int. Cl.
*G06F 3/0482* (2013.01)
*G06F 3/0481* (2022.01)
*G06F 3/04886* (2022.01)

(52) U.S. Cl.
CPC .......... *G06F 3/0482* (2013.01); *G06F 3/0481* (2013.01); *G06F 3/04886* (2013.01); *G06F 2203/04803* (2013.01)

(58) Field of Classification Search
CPC .. G06F 3/0482; G06F 3/0481; G06F 3/04886; G06F 2203/04803; G06F 3/14; G06F 3/048
See application file for complete search history.

(56) References Cited

U.S. PATENT DOCUMENTS 5,237,653 A    8/1993  Noguchi et al.
5,499,334 A  * 3/1996  Staab ................. G06F 9/44505
                                                        715/802
(Continued)

FOREIGN PATENT DOCUMENTS

JP        5040901 B2       10/2012
JP      2012/231428 A      11/2012
(Continued)

OTHER PUBLICATIONS

Korean Office Action dated Oct. 25, 2019, issued in Korean Patent Application No. 10-2013-0104431.

*Primary Examiner* — Kavita Stanley
*Assistant Examiner* — Phoebe X Pan
(74) *Attorney, Agent, or Firm* — Jefferson IP Law, LLP

(57) ABSTRACT

A method and an apparatus for changing a screen in an electronic device that provides a plurality of windows are provided. The method includes providing, by an electronic device, a plurality of windows functionally connected to the electronic device, selecting at least one window displaying a first application among the plurality of windows, obtaining an input related to a second application being executed in the selected at least one window, and displaying the second application through the at least one window, based on the obtained input. The present disclosure is not limited to a specific embodiment, but various embodiments based on a technical spirit of the present disclosure may be implemented.

21 Claims, 13 Drawing Sheets

Related U.S. Application Data continuation of application No. 14/470,097, filed on Aug. 27, 2014, now abandoned.

(56) References Cited

U.S. PATENT DOCUMENTS

| | | | |
|---|---|---|---|
| 5,742,285 A | 4/1998 | Ueda | |
| 5,745,109 A | 4/1998 | Nakano et al. | |
| 5,745,717 A | 4/1998 | Vayda et al. | |
| 5,757,371 A | 5/1998 | Oran et al. | |
| 5,790,820 A | 8/1998 | Vayda et al. | |
| 5,798,760 A | 8/1998 | Vayda et al. | |
| 6,002,403 A | 12/1999 | Sugiyama et al. | |
| 6,664,983 B2* | 12/2003 | Ludolph | G06F 3/0481 715/779 |
| 6,781,611 B1 | 8/2004 | Richard | |
| 6,961,906 B2 | 11/2005 | Hansen et al. | |
| 7,370,284 B2 | 5/2008 | Andrea et al. | |
| 7,487,467 B1 | 2/2009 | Kawahara et al. | |
| 7,747,965 B2 | 6/2010 | Holecek et al. | |
| 7,846,023 B2 | 12/2010 | Evans et al. | |
| 8,136,047 B2 | 3/2012 | Holecek et al. | |
| 8,245,154 B2 | 8/2012 | Karstens | |
| 8,296,684 B2 | 10/2012 | Duarte et al. | |
| 8,341,541 B2 | 12/2012 | Holecek et al. | |
| 8,375,323 B2 | 2/2013 | Yajima et al. | |
| 8,490,019 B2 | 7/2013 | Jarrett et al. | |
| 8,555,185 B2 | 10/2013 | Louch et al. | |
| 8,745,525 B1 | 6/2014 | Roskind | |
| 8,881,052 B2 | 11/2014 | Strauss et al. | |
| 8,881,152 B2 | 11/2014 | Li et al. | |
| 8,907,977 B2 | 12/2014 | Roth et al. | |
| 9,001,149 B2 | 4/2015 | Sirpal et al. | |
| 9,069,437 B2 | 6/2015 | Yao et al. | |
| 9,298,341 B2 | 3/2016 | Kim et al. | |
| 9,354,899 B2* | 5/2016 | Shah | G06F 9/451 |
| 9,489,078 B2 | 11/2016 | Seo et al. | |
| 9,569,090 B2 | 2/2017 | Seong et al. | |
| 9,626,065 B2 | 4/2017 | Gimpl et al. | |
| 9,648,279 B2 | 5/2017 | Shen et al. | |
| 2001/0015718 A1 | 8/2001 | Hinckley et al. | |
| 2003/0117440 A1* | 6/2003 | Hellyar | G06F 3/0489 715/767 |
| 2003/0119562 A1 | 6/2003 | Kokubo | |
| 2003/0189597 A1 | 10/2003 | Anderson et al. | |
| 2004/0066414 A1* | 4/2004 | Czerwinski | G06F 3/0481 715/781 |
| 2004/0085328 A1 | 5/2004 | Maruyama et al. | |
| 2004/0155908 A1 | 8/2004 | Wagner | |
| 2005/0010876 A1 | 1/2005 | Robertson et al. | |
| 2005/0108655 A1 | 5/2005 | Andrea et al. | |
| 2006/0099938 A1 | 5/2006 | Lee | |
| 2006/0123353 A1 | 6/2006 | Matthews et al. | |
| 2006/0136835 A1* | 6/2006 | Hochmuth | G09G 5/14 715/779 |
| 2006/0161847 A1 | 7/2006 | Holecek et al. | |
| 2007/0150810 A1 | 6/2007 | Katz et al. | |
| 2007/0220445 A1 | 9/2007 | Yach et al. | |
| 2008/0034317 A1 | 2/2008 | Fard et al. | |
| 2008/0098307 A1 | 4/2008 | Corbefin | |
| 2008/0109753 A1 | 5/2008 | Karstens | |
| 2009/0064035 A1 | 3/2009 | Shibata et al. | |
| 2009/0193364 A1 | 7/2009 | Jarrett et al. | |
| 2009/0228820 A1 | 9/2009 | Kim et al. | |
| 2009/0300541 A1* | 12/2009 | Nelson | G06F 3/0481 715/799 |
| 2009/0315867 A1* | 12/2009 | Sakamoto | G06F 3/03547 345/184 |
| 2010/0081475 A1 | 4/2010 | Chiang et al. | |
| 2010/0088634 A1 | 4/2010 | Tsuruta et al. | |
| 2010/0248788 A1 | 9/2010 | Yook et al. | |
| 2010/0313156 A1 | 12/2010 | Louch et al. | |
| 2011/0047459 A1* | 2/2011 | Van Der Westhuizen | G06F 3/04883 345/173 |
| 2011/0075031 A1* | 3/2011 | Jung | H04N 21/4316 348/565 |
| 2011/0087999 A1 | 4/2011 | Bichsel et al. | |
| 2011/0138314 A1* | 6/2011 | Mir | G06F 9/452 715/779 |
| 2011/0175930 A1 | 7/2011 | Hwang et al. | |
| 2011/0214063 A1* | 9/2011 | Saul | G06F 3/0481 715/740 |
| 2011/0244924 A1* | 10/2011 | Jung | G06F 9/451 455/566 |
| 2011/0250930 A1 | 10/2011 | Jung et al. | |
| 2011/0265035 A1 | 10/2011 | Lepage et al. | |
| 2012/0038678 A1* | 2/2012 | Hwang | G06F 3/1454 345/667 |
| 2012/0062688 A1 | 3/2012 | Shen et al. | |
| 2012/0084680 A1 | 4/2012 | Gimpl et al. | |
| 2012/0117495 A1* | 5/2012 | Sirpal | G06F 1/1616 715/761 |
| 2012/0117504 A1 | 5/2012 | Lemay et al. | |
| 2012/0192078 A1* | 7/2012 | Bai | G06F 3/04886 715/740 |
| 2012/0208593 A1 | 8/2012 | Yang et al. | |
| 2012/0274728 A1 | 11/2012 | Yasoshima | |
| 2012/0289290 A1 | 11/2012 | Chae et al. | |
| 2012/0319965 A1* | 12/2012 | Kurabayashi | G06F 9/5088 345/173 |
| 2013/0033477 A1 | 2/2013 | Sirpal et al. | |
| 2013/0042205 A1 | 2/2013 | Tsuda et al. | |
| 2013/0104051 A1 | 4/2013 | Reeves et al. | |
| 2013/0111371 A1 | 5/2013 | Reeves et al. | |
| 2013/0117440 A1 | 5/2013 | Fujiwara | |
| 2013/0125045 A1 | 5/2013 | Sun et al. | |
| 2013/0174179 A1 | 7/2013 | Park et al. | |
| 2013/0232451 A1 | 9/2013 | Chen et al. | |
| 2013/0263042 A1 | 10/2013 | Buening | |
| 2013/0290857 A1 | 10/2013 | Beveridge | |
| 2013/0290887 A1* | 10/2013 | Sun | G06F 3/0482 715/764 |
| 2013/0300684 A1 | 11/2013 | Kim et al. | |
| 2013/0321340 A1 | 12/2013 | Seo et al. | |
| 2013/0342483 A1 | 12/2013 | Seo et al. | |
| 2014/0013271 A1 | 1/2014 | Moore et al. | |
| 2014/0053097 A1 | 2/2014 | Shin et al. | |
| 2014/0089832 A1 | 3/2014 | Kim et al. | |
| 2014/0089833 A1 | 3/2014 | Hwang et al. | |
| 2014/0157163 A1* | 6/2014 | Strutin-Belinoff | G06F 3/04883 715/781 |
| 2014/0282217 A1 | 9/2014 | Musa et al. | |
| 2014/0351722 A1 | 11/2014 | Frederickson et al. | |
| 2015/0169099 A1 | 6/2015 | Lavallee | |
| 2015/0350297 A1 | 12/2015 | Yang et al. | |
| 2016/0034597 A1 | 2/2016 | Graf et al. | |
| 2017/0192730 A1 | 7/2017 | Yang et al. | |

FOREIGN PATENT DOCUMENTS

| | | |
|---|---|---|
| JP | 2014/511524 A | 5/2014 |
| KR | 20080010734 A | 1/2008 |
| KR | 10-2010-0107377 A | 10/2010 |
| KR | 20110016990 A | 2/2011 |
| KR | 10-2011-0112942 A | 10/2011 |
| KR | 10-2011-0113844 A | 10/2011 |
| KR | 10-2012-0092487 A | 8/2012 |
| KR | 10-2013-0054042 A | 5/2013 |
| KR | 10-2013-0076397 A | 7/2013 |
| KR | 10-2013-0126430 A | 11/2013 |
| KR | 10-2014-0039575 A | 4/2014 |
| KR | 10-1417318 A | 7/2014 |

* cited by examiner

METHOD AND APPARATUS FOR CHANGING SCREEN IN ELECTRONIC DEVICE

CROSS-REFERENCE TO RELATED APPLICATION(S)

This application is a continuation application of prior application Ser. No. 16/384,306, filed on Apr. 15, 2019, which is a continuation application of prior application Ser. No. 14/470,097, filed on Aug. 27, 2014 and was based on and claimed priority under 35 U.S.C. § 119(a) of a Korean patent application number 10-2013-0104431, filed on Aug. 30, 2013 in the Korean Intellectual Property Office, the disclosure of each of which is incorporated by reference herein in its entirety.

TECHNICAL FIELD

The present disclosure relates to a method and an apparatus for changing a screen in an electronic device that provides a plurality of windows.

BACKGROUND

Due to a remarkable development of an information and communication technology and a semiconductor technology, a supply and use of various electronic devices has been rapidly increased. The electronic device provides various functions such as a call function, a music playing function, a text message transmission and reception function, a digital broadcast receiving function, a short distance wireless communication function, an internet access function, and/or the like.

Meanwhile, the electronic device provides a multi-tasking function that can simultaneously execute a plurality of applications. The electronic device may display a plurality of applications to be overlapped. Further, the electronic device may provide a multi-window function that simultaneously executes a plurality of applications through a plurality of windows.

As described above, as the plurality of applications are overlapped to be displayed, the electronic device may provide a screen change function that changes a screen into an execution screen of another application. For example, when a specific key (e.g., a home key) is pressed for a certain time or more, the electronic device may provide a list of applications being executed in a background, and display the execution screen of application selected from the list in the uppermost portion.

However, when a screen change is requested, the electronic devices according to the related art may provide a list of all executed applications. Thus, because all applications are provided as a list, a user of electronic device according to the related art may find select a desired application from the list to be uneasy and/or difficult. Further, as all applications executed in a plurality of windows are provided as a list, a user of the electronic device according to the related art may have difficulty recognizing the window in which application is being executed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for changing a screen in an electronic device that can easily perform a screen change in a multi-window mode.

In accordance with an aspect of the present disclosure, a method is provided. The method includes providing, by an electronic device, a plurality of windows functionally connected to the electronic device, selecting at least one window displaying a first application among the plurality of windows, obtaining an input related to a second application being executed in the selected at least one window, and displaying the second application through the at least one window, based on the obtained input.

In accordance with another aspect of the present disclosure, an electronic device is provided. The electronic device includes a display unit configured to include a plurality of windows, and a controller configured to select at least one window displaying a first application among the plurality of windows, and to obtain an input related to a second application being executed in the selected at least one window, wherein the controller controls the display unit to display the second application through the at least one window, based on the input.

In accordance with another aspect of the present disclosure, a computer readable medium containing program instructions for causing a computer to perform the method is provided. The computer readable medium includes providing, by an electronic device, a plurality of windows functionally connected to the electronic device, selecting at least one window displaying a first application among the plurality of windows, displaying application information related to a second application executed in the selected at least one window through the at least one window, obtaining an user input related to the application information, and displaying the second application through the at least one window, based on the obtained user input.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
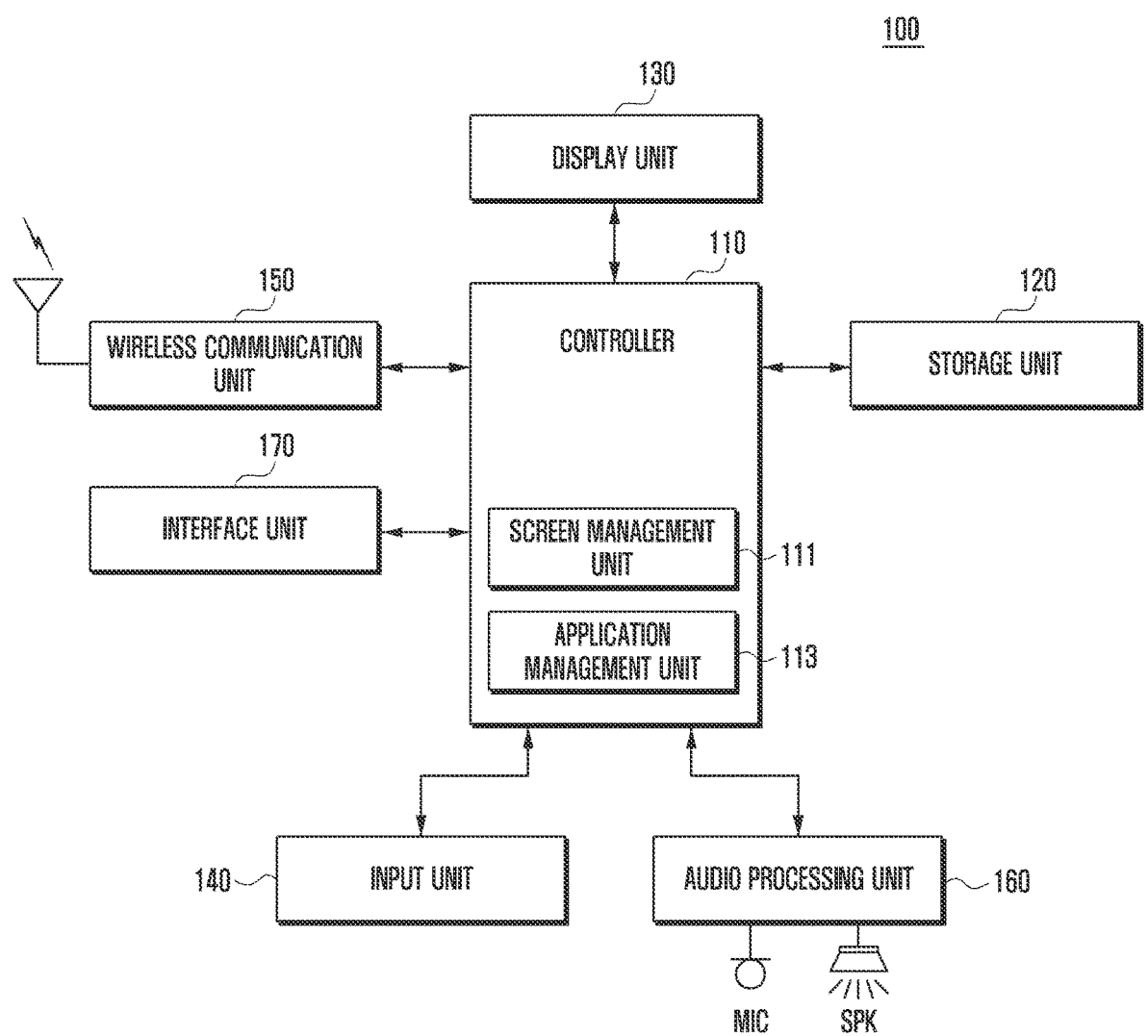
FIG. 1 is a block diagram illustrating a configuration of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

Prior to a detailed description, a multi-window mode may be a mode that simultaneously executes applications by using a plurality of windows. A plurality of applications may be executed through each window. Each window has a restriction of display size such that the plurality of applications may be overlapped on one window. For example, each window may display an execution screen of the most recent application.

FIG. 1 is a block diagram illustrating a configuration of an electronic device according to an embodiment of the present disclosure.

Referring to FIG. 1, the electronic device 100 according to an embodiment of the present disclosure may include a controller 110, a storage unit 120, a display unit 130, an input unit 140, a wireless communication unit 150, an audio processing unit 160, and an interface unit 170.

The audio processing unit 160 may be connected to (or otherwise include) a speaker (SPK) to output an audio signal which is transmitted and received during a call, an audio signal included in the received message, or an audio signal according to a play of audio file stored in the storage unit 120. The audio processing unit 160 may be connected to (or otherwise include) a microphone (MIC) to collect user's voice or other audio signal. The audio processing unit 160 according to various embodiments of the present disclosure may output various effect sounds according to the operation of the electronic device 100 through the SPK. For example, the audio processing unit 160 may output an effect sound to notify a selection of application, an effect sound to notify a generation of screen change event, an effect sound to notify a selection of specific window in a state in which a multi-window is displayed, and an effect sound corresponding to an inputted key through the SPK.

The input unit 140 may include a plurality of input keys function keys, and/or the like to receive number or character information, and to set various functions. The function keys may include a direction key, a side key, and a shortcut key, and/or the like set to perform a specific function. Further, the input unit 140 may generate a user setting and a key signal related to a function control of the electronic device 100 to send to the controller 110. The input unit 140 may be formed of one of input means such as a Ball Joystick, an optical joystick, a wheel key, a touch key, a touch pad, a touch screen, the like, or a combination thereof. According to various embodiments of the present disclosure, the input unit 140 may transmit an input signal of turning a multi window mode on/off, an input signal of requesting a screen change for a specific window among the multi windows, an input signal of selecting one of applications executed in a specific window, and/or the like, to the controller 110.

The wireless communication unit 150 may support a wireless communication function of the electronic device 100. The wireless communication unit 150 may include a mobile communication module to support a mobile communication (e.g., a 3G or 4G mobile communication, and/or the like) function, a short distance wireless communication module to support a short distance wireless communication function (e.g., Near Field Communication (NFC), Bluetooth, Wireless LAN, Wi-Fi, Wi-Fi Direct, Digital Living Network Alliance (DLNA), Miracast, and/or the like), and/or the like. According to various embodiments of the present disclosure, the wireless communication unit 150 may support a wireless connection with anther electronic device (e.g., a tablet PC, a monitor, a notebook PC, a digital TV, and/or the like). For example, the wireless communication unit 150 may support to configure a multi-window by connecting to other electronic device through a short distance wireless communication (e.g., Bluetooth, Wireless LAN, Wi-Fi, Wi-Fi Direct, DLNA, Miracast, and/or the like).

The interface unit 170 may support a wired connection with another electronic device (e.g., a tablet PC, a monitor, a notebook PC, a digital TV, and/or the like). The interface unit 170 may be a connector having a standard of Universal Serial Bus (USB), Micro USB, High Definition Multimedia Interface (HDMI), Micro HDMI, mini HDMI, and/or the like. However, various embodiments of the present disclosure are not limited thereto. For example, the interface unit 170 may be formed of a connector having various standards.

The display unit 130 (e.g., a display screen) may display information inputted by a user or information to be provided to the user as well as various menus of the electronic device 100. For example, the display unit 130 may provide various screens according to a use of the electronic device 100, such as a menu screen, a web page screen, a call screen, and/or the like. The display unit 130 may be formed of a Liquid Crystal Display (LCD), an Organic Light Emitted Diode (OLED), and/or the like. Meanwhile, when the display unit 130 may be formed in a form of a touch screen, the display unit 130 may perform a function of input unit 140.

According to various embodiments of the present disclosure, the display unit 130 may display an application execution screen. For example, when a plurality of applications are executed in a state in which a multi-window mode is activated, the display unit 130 may be split into plural screens (e.g., two). Each of the execution screen of the plurality of applications may be displayed in each split window. For example, when a second application is executed in a state in which a first application is displayed in a full screen, the display unit 130 may be split into two screens, display the execution screen of the first application in a first split window, and display the execution screen of the second application in a second split window. In this state, if a third application is executed, the display unit 130 may display the execution screen of the third application in the first split window. In this case, the first split window may display the first application and the third application to be overlapped.

Alternatively, according to various embodiments of the present disclosure, the display unit 130 may display the execution screen of the plurality of applications through a pop-up window, without splitting the screen. For example, when the second application is executed in a state in which the first application is displayed in a full screen, the display unit 130 may output a pop-up window, and output the execution screen of the second application on the pop-up window. In this state, if the third application is executed, the display unit 130 may display the execution screen of the third application on the pop-up window. In this case, the pop-up window may display the second application and the third application to be overlapped.

According to various embodiments of the present disclosure, the display unit 130 may display at least one of the applications being executed in a specified window or in a specified pop-up window when a screen change event occurs in the specified window or in the specified pop-up window among a plurality of windows. The at least one of the applications may be displayed as, for example, a list, an icon, a thumbnail, a text, and/or the like. When one application is selected from the at least one of the applications, the display unit 130 may change the screen of the specified window or the specified pop-up window into the execution screen of the selected application.

The storage unit 120 may store an application program necessary for other option function such as a sound play function, an image or video play function, an internet access function, a text message function, a map service function, and/or the like as well as an Operating System (OS) of the electronic device 100. Further, the storage unit 120 may store various data such as a video data, a game data, a music data, a movie data, a map data, and/or the like. According to various embodiments of the present disclosure, the storage unit 120 may store, for example, a multi-window operating program to execute the application and manage a change of screen in a multi-window mode. The multi-window operating program may include, for example, a routine to configure the multi-window buy using a screen split, a pop-up window, and other electronic device or display unit, a routine to control an execution of application in the multi-window, a routine to display a list of applications being executed in a corresponding area (window) when a screen change event is detected, and a routine to change a screen of the corresponding area (window) into an execution screen of the application selected from the list, and/or the like.

The controller 110 may control an overall operation of the electronic device 100 and a signal flow between internal blocks of the electronic device 100, and perform a data processing function to process data. For example, the controller 110 may be formed with a Central Processing Unit (CPU), an Application Processor (AP), and/or the like. Further, the controller 110 may be formed with a single-core processor or a multi-core processor.

According to various embodiments of the present disclosure, the controller 110 may control an application execution in a multi-window mode or a screen change in each window. For example, the controller 110 may execute at least one application for each window in the multi-window mode. When the screen change event is detected in a specified window among a plurality of windows (e.g., in response to detecting a screen change event in a particular window), the controller 110 may display a list of applications being executed in the specified window. When the at least one application is selected from the list (e.g., in response to selection of at least one application), the controller 110 may control the display unit 130 to display the execution screen of the selected application through the specified window.

The controller 110 may include a screen management unit 111 and an application management unit 113. The screen management unit 111 may control to split the window with a specified number (e.g., two) when the plurality of applications are executed in the multi-window mode, and to display the execution screen of the plurality of applications to each split window. For example, the screen management unit 111 may select (e.g., focus on) one of a plurality of windows. Alternatively, when the plurality of applications are executed in the electronic device 100 operated in the multi-window mode, the screen management unit 111 may control the display unit 130 to display at least part of the execution screen of the plurality of applications by using a pop-up window. In this case, the size and location of the pop-up window may be changed.

According to various embodiments of the present disclosure, the electronic device 100 may be connected wireless or wired with other electronic device including the display unit 130 or an external display device to operate the multi-window mode. In this case, the electronic device 100 may provide at least one window among a plurality of windows in other electronic device or the external display device. The screen management unit 111 may control to display the execution screen of the plurality of applications through each of the plurality of windows.

The application management unit 113 may manage the execution of the application in the multi-window mode, or manage information on the applications being executed in each of a plurality of windows. For instance, when the screen change event is detected in a specified window, the application management unit 113 may identify information of applications being executed in the specified window. The application management unit 113 may display a list of the identified applications in the specified window.

In the meantime, although not shown in FIG. 1, the electronic device 100 may further include elements having an equivalent level to the above-mentioned elements. For example, according to various embodiments of the present disclosure, the electronic device 100 may selectively further include elements having extra features such as a camera module to photograph a still image or a video, a broadcast receiving module to receive a broadcast, a sensor module including a plurality of sensors (e.g., a motion sensor, an illumination sensor, an acceleration sensor, a geomagnetic sensor, and/or the like) a digital sound play module such as MP3 module, and/or the like.

Figure 2:
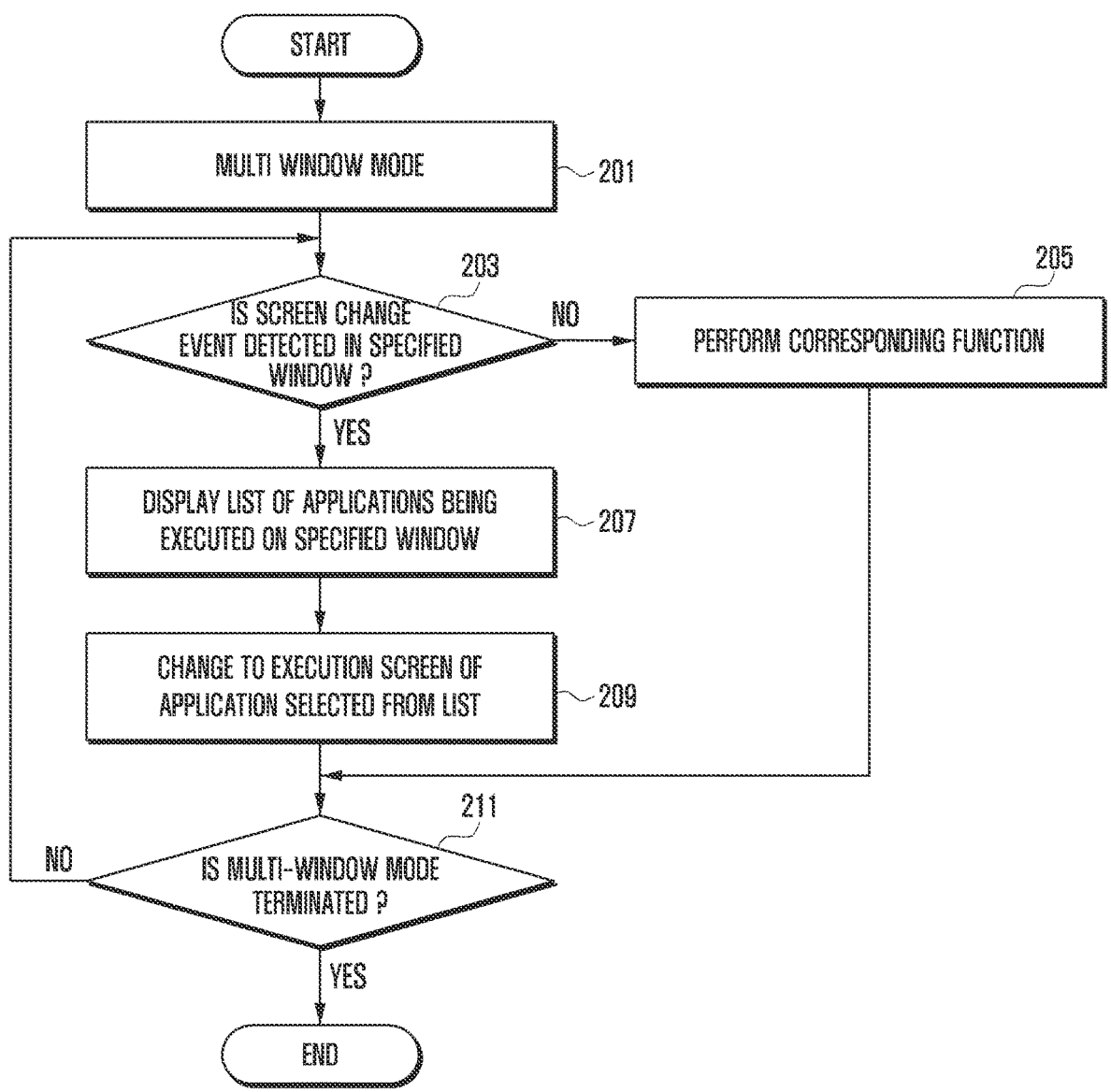
FIG. 2 is a flowchart illustrating a method of changing a screen of an electronic device according to an embodiment of the present disclosure.

FIG. 2 is a flowchart illustrating a method of changing a screen of an electronic device (e.g., an electronic device 100) according to an embodiment of the present disclosure.

Referring to FIG. 2, according to various embodiments of the present disclosure, at operation 201, the controller 110 according may perform a multi window mode.

At operation 203, the controller 110 may determine whether the screen change event is detected in a specified window. The screen change event may be generated through an input of a specified function key, an input of selecting a screen change menu (or a screen change soft key) displayed on the display unit 130 when touching at least one window among a plurality of windows, a preset gesture input, or a combination thereof.

If the controller 110 does not determine that the screen change event is detected at operation 203, then the controller 110 may proceed to operation 205 at which the controller 110 may perform a corresponding function. For example, the corresponding function may include an operation of executing a new application according to a request from the user through a specified window among multi-windows by the controller 110, an operation of moving an application being executed in the specified window to another window, or an operation of switching applications displayed in the specified window and the upper most portion of another window, and/or the like.

In contrast, if the controller 110 determines that the screen change event is detected at operation 203, then the controller 110 may proceed to operation 207 at which the controller 110 displays a list of applications being executed on the specified window on the display unit 130. The lists may be displayed by, for example, at least one of an icon, a thumbnail image, a text, and/or the like.

At operation 209, the controller 110 may change the screen of the specified window to the execution screen of the application selected from the list.

At operation 211, the controller 110 may determine whether a multi-window mode is terminated. If the controller 110 determines that the multi-window mode is not terminated at operation 211, then the controller 110 may return to operation 203. In contrast, if the controller 110 determines that the multi-window mode is terminated at operation 211, then the controller 110 may terminate the screen change operation according to various embodiments of the present disclosure.

In contrast, according to various embodiments of the present disclosure, the electronic device 100 may provide a plurality of windows. The plurality of windows may be functionally connected to the electronic device 100. For example, in order to provide a plurality of windows, the electronic device 100 may divide a single window into a plurality of windows, or generate a plurality of windows in which at least part is overlapped. Alternatively, the electronic device 100 may provide a plurality of windows through a plurality of display units functionally connected to the electronic device 100.

The controller 110 may obtain a selection of at least one window displaying a first application among a plurality of windows. For example, the controller 110 may obtain a user input to select at least one window. The controller 110 may display the at least one window selected through the user input to be visually distinguished from another window.

The controller 110 may obtain an input related to a second application being executed in the selected at least one window. The controller 110 may display the second application through the at least one window based on the obtained input. For example, the controller 110 may display a selection menu to select the second application on the selected at least one window, and display the second application through the at least one window based on the input obtained through the selection menu.

Alternatively, the controller 110 may display application information related to the second application being executed in the selected at least one window on the at least one window, obtain user input related to the application, and display the second application through the at least one window based on the obtained user input. The application information may be displayed by at least one of a thumbnail image, an icon, a text, and/or the like.

According to various embodiments of the present disclosure, the controller 110 may display application information related to a plurality of applications executed in the electronic device 100. For example, the controller 110 may display an application tray that displays applications provided by the electronic device 100 according to the input of the user.

When at least part of the application information is selected, the controller 110 may select the window in which the application related to the selected at least part of the application information is executed as the at least one window. The controller 110 may select the application related to the selected at least part of the application information as the second application, and may display the second application through the at least one window.

For example, assuming that the plurality of windows include a first window and a second window, the controller 110 may display a first selection menu related to the first window and a second selection menu related to the second window when the application related to the selected at least part of the application information among the application information is executed in both the first window and the second window. The controller 110 may select the first window as the at least one window when the first selection menu is selected, and select the second window as the at least one window when the second selection menu is selected.

The controller 110 may differently display at least one of a color, a text, or a location of the first and the second selection menus. Alternatively, the controller 110 may determine a display location of the first and the second selection menus based on a location relation between the first and the second windows. For example, the controller 110 may vertically display the first and the second selection menus when the first and second windows are vertically arranged.

Figure 3:
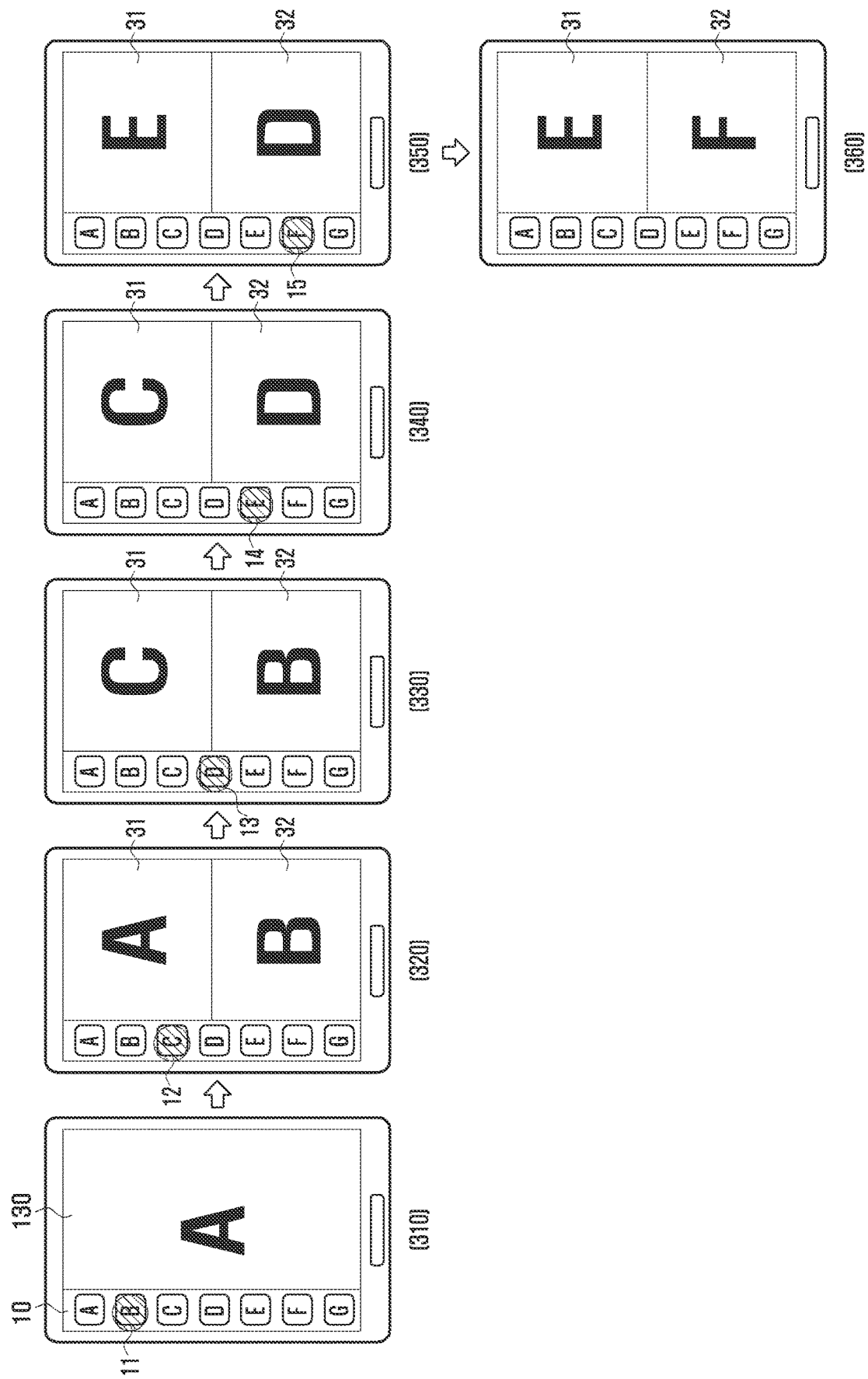
FIG. 3 is a diagram illustrating a method of executing a plurality of applications in a multi-window mode according to an embodiment of the present disclosure.

FIG. 3 is a diagram illustrating a method of executing a plurality of applications in a multi-window mode according to an embodiment of the present disclosure.

Referring to FIG. 3, according to various embodiments of the present disclosure, the controller 110 may activate a multi-window mode. For example, when a preset key is input (e.g., a cancel key is input for one or more seconds) in a state in which an application A is executed in a full screen, an application tray 10 may be displayed in one side of the screen as illustrated in a drawing of reference numeral 310. The application tray 10 may include an icon indicating applications included in the electronic device 100. Alternatively, the application tray 10 may include only the icons of the applications which are able to be executed simultaneously with the application A which is currently being executed. The application tray 10 may disappear on a screen if there is no input for a given time (e.g., 3 seconds).

When a selection of a first icon 11 (e.g., a touch input on the first icon 11) is detected in the application tray 10 in the reference numeral 310 (e.g., in response to detection of selection of the first icon 11), the controller 110 may control the display unit 130 to divide a window into two windows as illustrated in a drawing of reference numeral 320, to display an execution screen of the application A on a first split window 31, and to display an execution screen of the application B corresponding to the first icon 11 on a second split window 32.

When a selection of a second icon 12 (e.g., a touch input on the second icon 12) is detected in the application tray 10 in the drawing of reference numeral 320 (e.g., in response to detection of selection of the second icon 12), the controller 110 may control the display unit 130 to display an execution screen of the application C corresponding to the second icon 12 on the first split window 31. The second split window 32 may maintain the execution screen of the application B.

When a selection of a third icon 13 (e.g., a touch input on the third icon 13) is detected in the application tray 10 in a drawing of reference numeral 330 (e.g., in response to detection of selection of the third icon 13), the controller 110 may control the display unit 130 to display an execution screen of the application D corresponding to the third icon 13 on the second split window 32. The first split window 31 may maintain the execution screen of the application C.

When a selection of a fourth icon 14 (e.g., a touch input on the fourth icon 14) is detected in the application tray 10 in a drawing of reference numeral 340 (e.g., in response to detection of the selection of the fourth icon 14), the controller 110 may control the display unit 130 to display an execution screen of the application E corresponding to the fourth icon 14 on the first split window 31. The second split window 32 may maintain the execution screen of the application D.

When a selection of a fifth icon 15 (e.g., a touch input on the fifth icon 15) is detected in the application tray 10 in a drawing of reference numeral 350 (e.g., in response to selection of the fifth icon 15), the controller 110 may control the display unit 130 to display an execution screen of the application F corresponding to the fifth icon 15 on the second split window 32. The first split window 31 may maintain the execution screen of the application E.

In a drawing of reference numeral 360, the applications A, C and E may be executed in the first split window 31, and the applications B, D and F may be executed in the second split window 32.

In the meantime, FIG. 3 illustrates that the application corresponding to the selected icon is alternately executed in the first split window 31 or the second split window 32 when the icon included in the application tray 10 is selected. However, various embodiments of the present disclosure are not limited thereto. For example, according to various embodiments of the present disclosure, an input to touch-and-drag the icon of the application tray 10 into the first split window 31 or the second split window 32 is detected, an application corresponding to the touch-and-dragged icon may be executed in a corresponding window. Thus, a user may execute a specific application in a desired window among a plurality of windows.

Further, FIG. 3 illustrates that the application tray 10 is displayed in a left end of the screen. However, various embodiments of the present disclosure are not limited thereto. For example, the application tray 10 may be displayed in the right end, upper end or lower end of the screen, or may be displayed in an arbitrary location (e.g., a center of screen).

Further, FIG. 3 illustrates that the application tray 10 may be turned on/off through the preset key input. However, various embodiments of the present disclosure are not limited thereto. For example, according to various embodiments of the present disclosure, a menu having an icon type that turns on/off the application tray 10 may be displayed in one side of the screen.

Further, FIG. 3 illustrates that a window is split into two windows. However, various embodiments of the present disclosure are not limited thereto. For example, according to various embodiments of the present disclosure, a window may be split into three or more windows.

Figure 4:
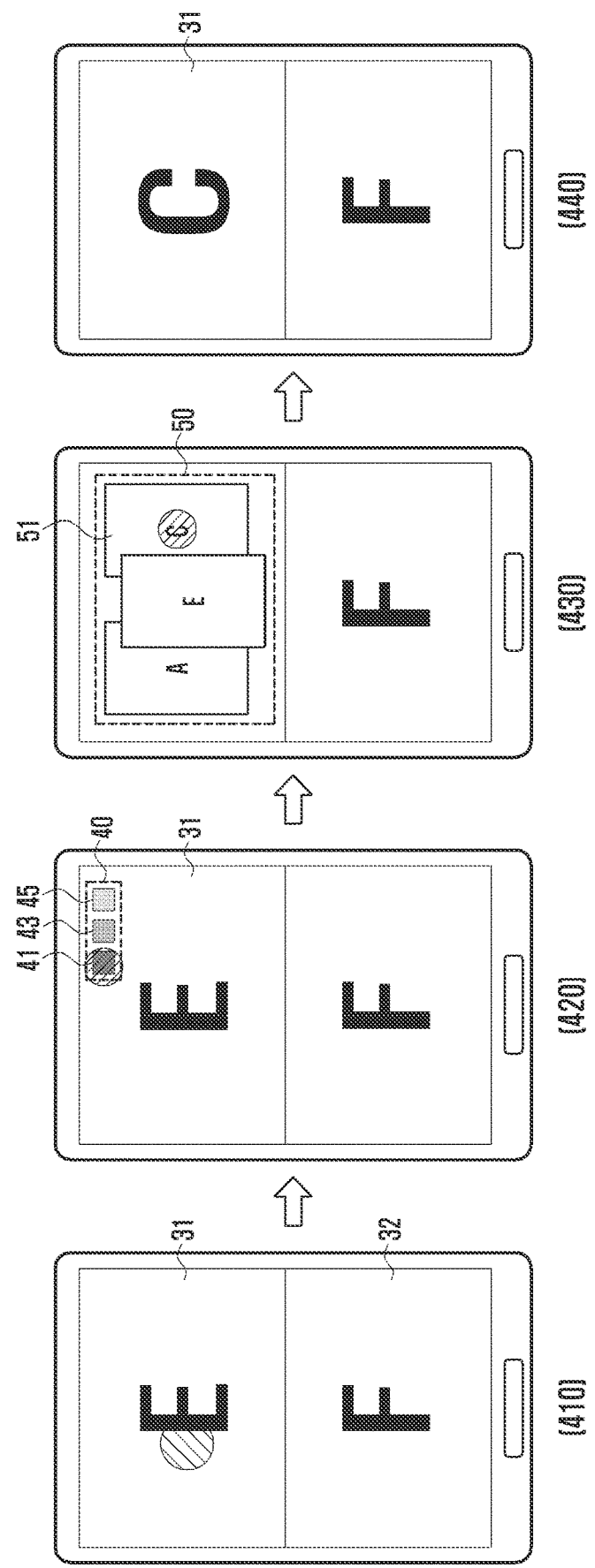
FIGS. 4 and 5 are diagrams of screen illustrating a method of changing a screen of an electronic device according to an embodiment of the present disclosure.
Figure 5:
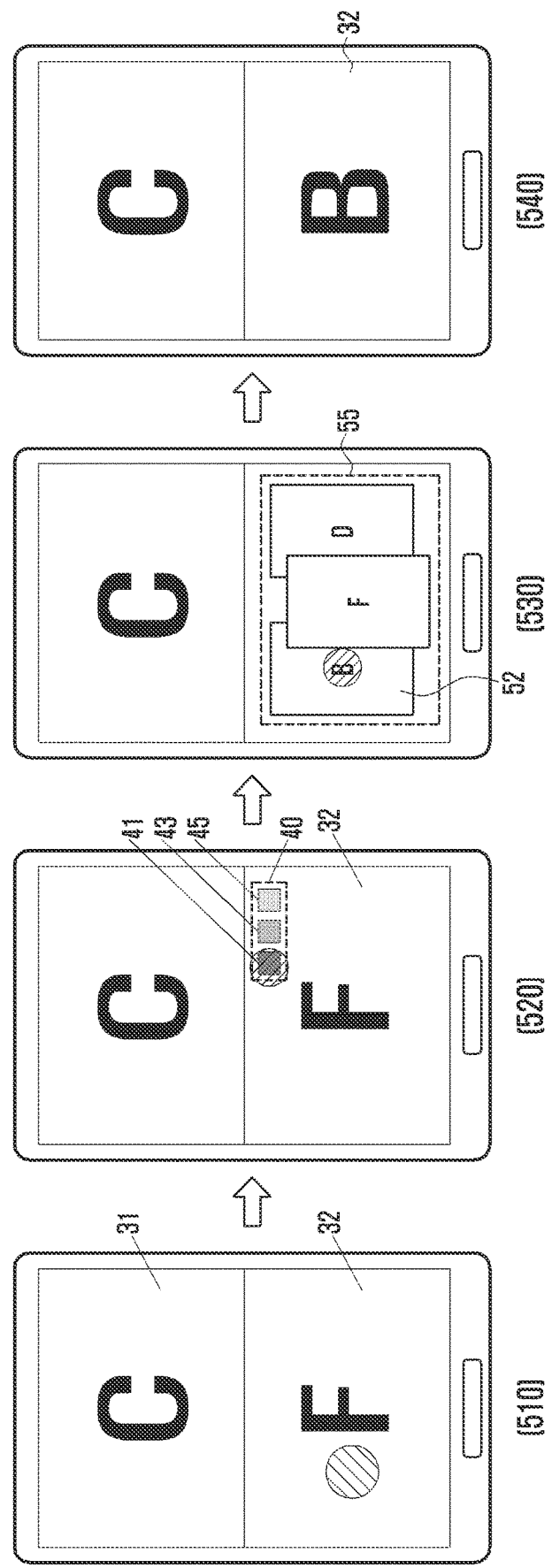

FIGS. 4 and 5 are diagrams of screen illustrating a method of changing a screen of an electronic device according to an embodiment of the present disclosure.

Referring to FIG. 4, a drawing of reference numeral 410 indicates a state in which a plurality of applications are executed through a multi-window through the above-mentioned method of FIG. 3. For example, the drawing of reference numeral 410 may indicate a state in which applications A, C and E are executed in the first split window 31, and applications B, D and F are executed in the second split window 32.

For example, when a touch is detected in the first split window 31 (e.g., in response to detection of selection of the first split window 31), as shown in a drawing of reference numeral 420, the controller 110 may control to display a function menu window 40 including various menus which are available in the first split window 31 in one side of the first split window 31. For example, the function menu window 40 may include a task change menu 41 to call a list of applications being executed, a window termination menu 43 to turn off a window being displayed, and a full screen change menu 45 to change a split window into a full screen. The function menu window 40 may be removed from the screen if there is no input for a certain time (e.g., a threshold time) or more (e.g., 3 second).

In the drawing of reference numeral 420, when the task change menu 41 is touched (e.g., in response to detection of selection of the task change menu 41), the controller 110 may display a list 50 of the applications being executed in the first split window 31. For example, the controller 110 may display the list 50 including a thumbnail image for applications A, C and E as shown in a drawing of reference numeral 430.

When a thumbnail image 51 corresponding to the application C is selected (e.g., touched) from the list 50 (e.g., in response to detection of selection of the thumbnail image 51), the controller 110 may control to display the execution screen of application C in the first split window 31 as shown in a drawing of reference numeral 440.

Referring to FIG. 5, a drawing of reference numeral 510 indicates a state in which a plurality of applications are executed through a plurality of windows through the above-mentioned method of FIG. 3. For example, the drawing of reference numeral 510 may indicate a state in which applications A, C and E are executed in the first split window 31, and applications B, D and F are executed in the second split window 32.

In the drawing of reference numeral 510, when the second split window 32 is touched (e.g., in response to selection of the second split window 32), as shown in a drawing of reference numeral 520, the controller 110 may control to display a function menu window 40 including various menus which are available in the second split window 32 in one side of the second split window 32. For example, the function menu window 40 may include a task change menu 41, a window termination menu 43, and a full screen change menu 45.

In the drawing of reference numeral 520, when the task change menu 41 is touched (e.g., in response to detection of selection of the task change menu 41), the controller 110 may display a list 55 of the applications being executed in the second split window 32. For example, the controller 110 may display the list 55 including a thumbnail image for applications B, D and F as shown in a drawing of reference numeral 530. When a thumbnail image 52 corresponding to the application B is selected (e.g., touched) from the list 55 (e.g., in response to detection of selection of the thumbnail image 52), the controller 110 may control to display the execution screen of application B in the second split window 32 as shown in a drawing of reference numeral 540.

In the meantime, FIGS. 4 and 5 illustrate that the function menu window 40 is displayed when an input to touch a part of the first split window 31 or the second split window 32 is detected. However, various embodiments of the present disclosure are not limited thereto. For example, according to various embodiments of the present disclosure, the function menu window 40 may be displayed based on a specified key input or a specified gesture input. Alternatively, according to various embodiments of the present disclosure, a gesture for executing a menu included in the function menu window 40 may be specified. For example, the controller 110 may execute a function corresponding to the task change menu 41 when a first gesture is inputted in the first split window 31 or the second split window 32, execute a function corresponding to the window termination menu 43 when a second gesture is inputted, and execute a function corresponding to the full screen change menu 45 when a third gesture is inputted.

In addition, FIGS. 4 and 5 illustrate that the lists 50 and 55 are displayed by using a thumbnail image for the execution screen of the application. However, various embodiments of the present disclosure are not limited thereto. For example, according to various embodiments of the present disclosure, the lists 50 and 55 may be displayed by using an icon or a text (e.g., a name of application), or by combining at least one of a thumbnail image, an icon, a text, and/or the like.

Figure 6:
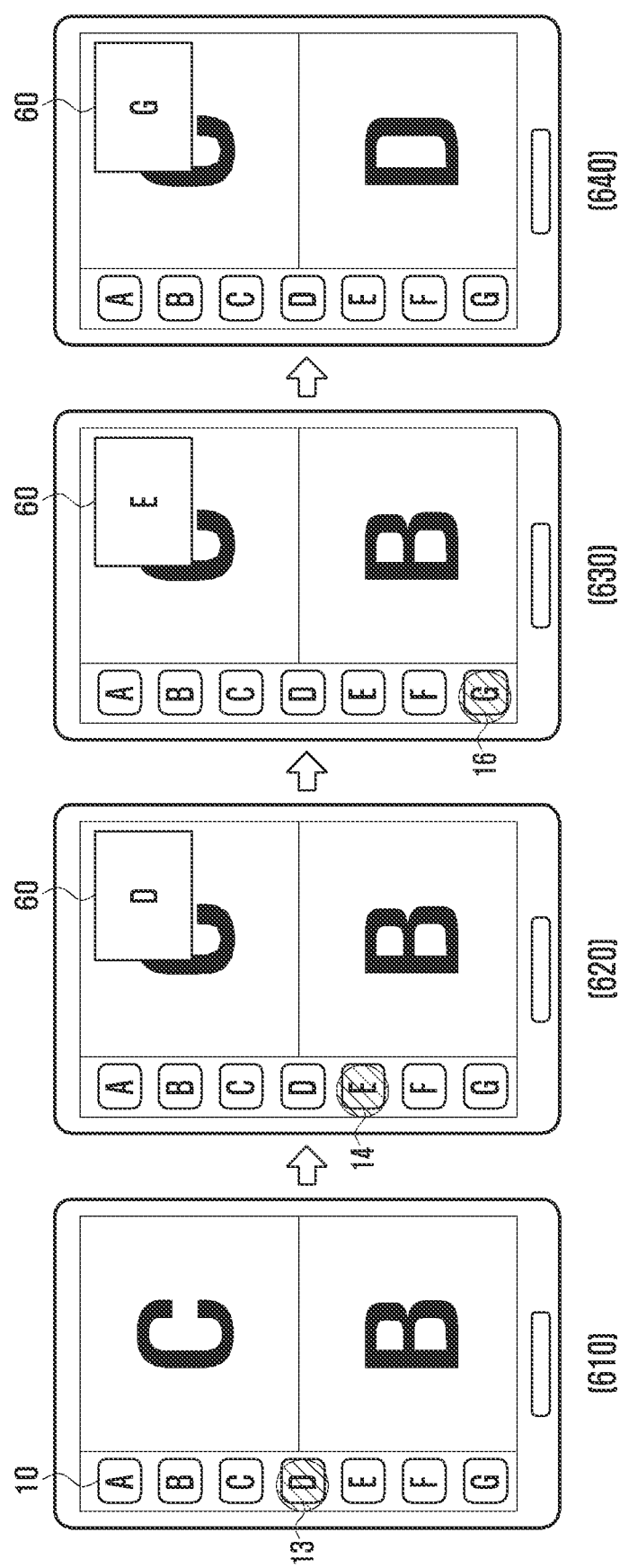
FIGS. 6 and 7 are diagrams of screen illustrating a method of changing a screen of an electronic device according to various embodiments of the present disclosure.
Figure 7:
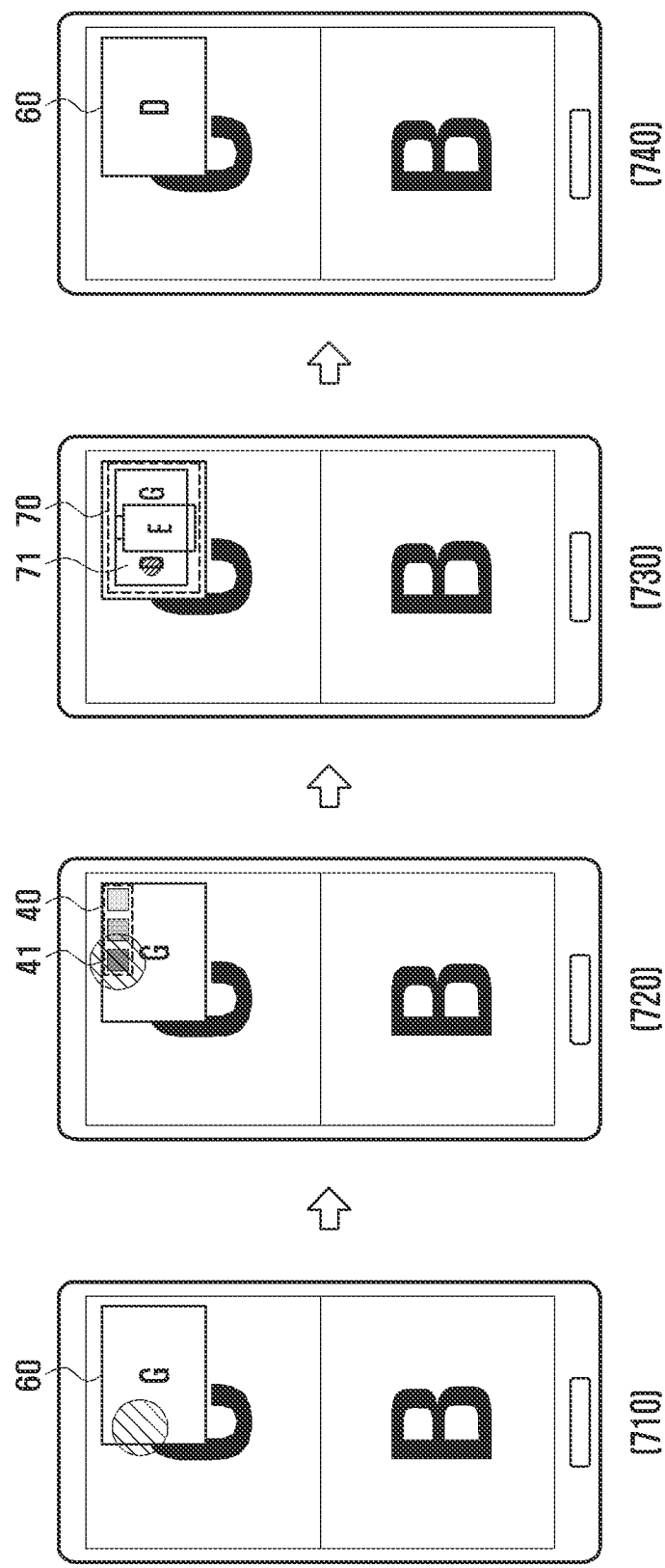

FIGS. 6 and 7 are diagrams of screen illustrating a method of changing a screen of an electronic device according to various embodiments of the present disclosure. FIGS. 6 and 7 illustrate an example of changing a screen in a multi window mode by using a pop-up window.

Referring to FIG. 6, according to various embodiments of the present disclosure, the controller 110 may activate the multi window mode, and may detect, for example, a specified key input, a menu input, a gesture input, and/or the like. In this case, as shown in a drawing of reference numeral 610, the controller 110 may display the application tray 10 including icons corresponding to the applications executable in the electronic device 100 on the display unit 130.

When a third icon 13 corresponding to the application D of the application tray 10 is selected (e.g., touched) (e.g., in response to detection of selection of the third icon 13), as shown in a drawing of reference numeral 620 the controller 110 may output a pop-up window 60 to one side of the screen, and may display the execution screen of the application D on the pop-up window 60. The size or location of the pop-up window 60 may be changed.

In the drawing of reference numeral 620, when a selection of a fourth icon 14 of the application tray 10 is detected (e.g., in response to detection of selection of the fourth icon 14), as shown in a drawing of reference numeral 630, the controller 110 may display the execution screen of the application E on the pop-up window 60.

In the drawing of reference numeral 630, when a selection of a sixth icon 16 of the application tray 10 is detected (e.g., in response to detection of selection of the sixth icon 16), as shown in a drawing of reference numeral 640, the controller 110 may display the execution screen of the application G on the pop-up window 60.

Referring to FIG. 7, when the pop-up window 60 is touched as shown in a drawing of reference numeral 710 in a state in which a plurality of applications (e.g., D, E, G) are executed (e.g., in response to detection of selection of the pop-up window 60), the controller 110 may output the function menu window 40 in one side of the pop-up window 60 as shown in a drawing of reference numeral 720. When the task change menu 41 is selected (touched) from the function menu window 40 (e.g., in response to detection of selection of the task change menu 41), the controller 110 may display a list 70 of the applications being executed in the pop-up window 60 on the pop-up window 60 as shown in a drawing of reference numeral 730.

When a specific thumbnail image 71 (e.g., a thumbnail image corresponding to the application D) is selected (e.g., touched) from the list (e.g., in response to detection of selection of the specific thumbnail image 71), the controller 110 may change the screen of the pop-up window 60 to the execution screen of the application D as shown in a drawing of reference numeral 740.

In the meantime, FIGS. 6 and 7 that the pop-up window 60 is displayed separately in the state of multi-window in which the screen is split into two screens. However, various embodiments of the present disclosure are not limited thereto. For example, according to various embodiments of the present disclosure, when the screen is not split, or when the execution of the application is requested even when the screen is split into three or more screens, the execution screen of the requested application may be displayed by using the pop-up window 60.

Figure 8A:
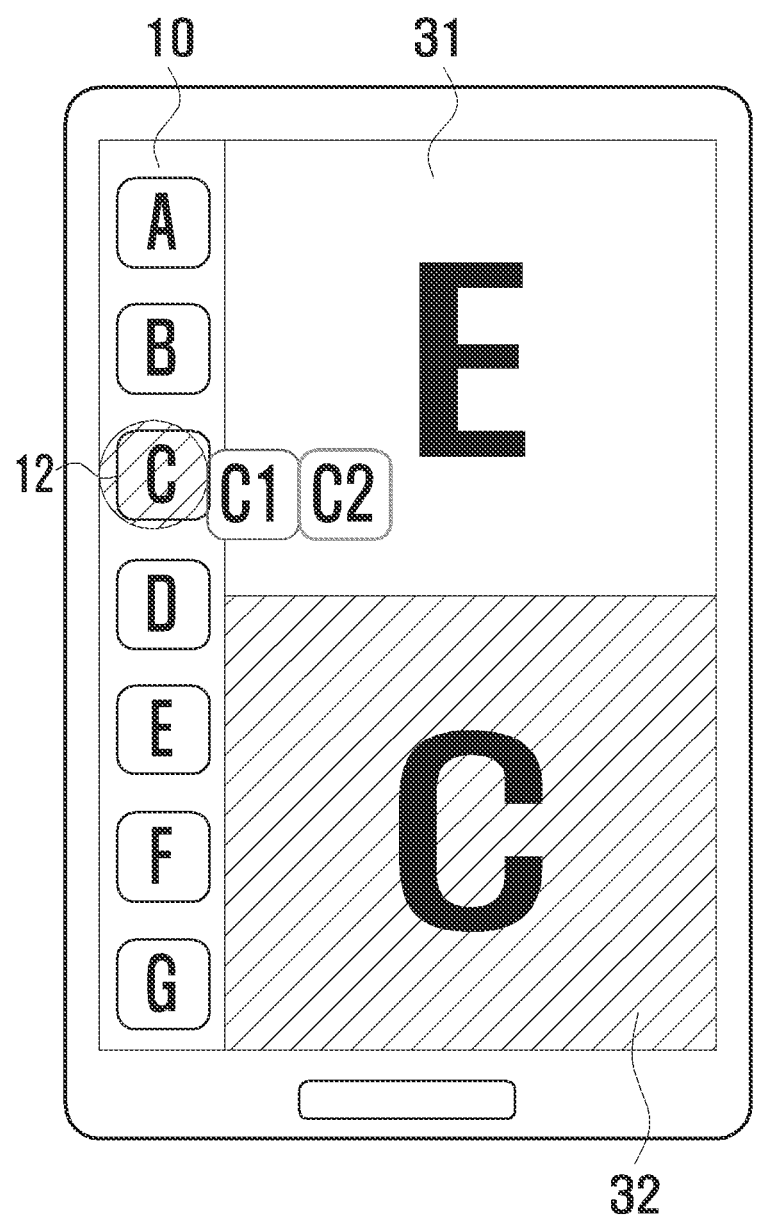
FIGS. 8A, 8B, 8C, 8D, and 8E are diagrams of screen illustrating a method of changing a screen of an electronic device according to various embodiments of the present disclosure.

FIGS. 8A, 8B, 8C, 8D, and 8E are diagrams of screen illustrating a method of changing a screen of an electronic device according to various embodiments of the present disclosure Referring to FIGS. 8A, 8B, 8C, 8D, and 8E, according to various embodiments of present disclosure, the controller 110 may change the screen by using an icon included in the application tray 10. For example, as shown in FIG. 8A, the controller 110 may display the execution screen of the application E on the first split window 31, display the execution screen of the application C on the second split window 32, and display the application tray 10 in the left end of the screen.

When a second icon 12 is selected in the application tray 10 (e.g., in response to detection of selection of the second icon 12), the controller 110 may display an icon of applications being executed on the second split window 32 in which an application corresponding to the selected second icon 12 is executed. In this case, the controller 110 may visually differently display the second split window 32 in which an application corresponding to the second icon 12 is executed. The visually different display is to notify a user of a state in which the application corresponding to the second icon 12 is executed in the second split window 32.

Referring to FIG. 8A, it can be recognized that applications C, C1 and C2 are being executed in the second split window 32. The applications C, C1 and C2 may mean that the same application (e.g., an Internet browser) was executed several times. Meanwhile, although not illustrated, in FIG. 8A, when at least one icon (e.g., C2) is selected (e.g., in response to detection of selection of at least one icon), the controller 110 may display execution screen of application corresponding to the selected at least one icon C2 on the second split window 32.

Figure 8B:
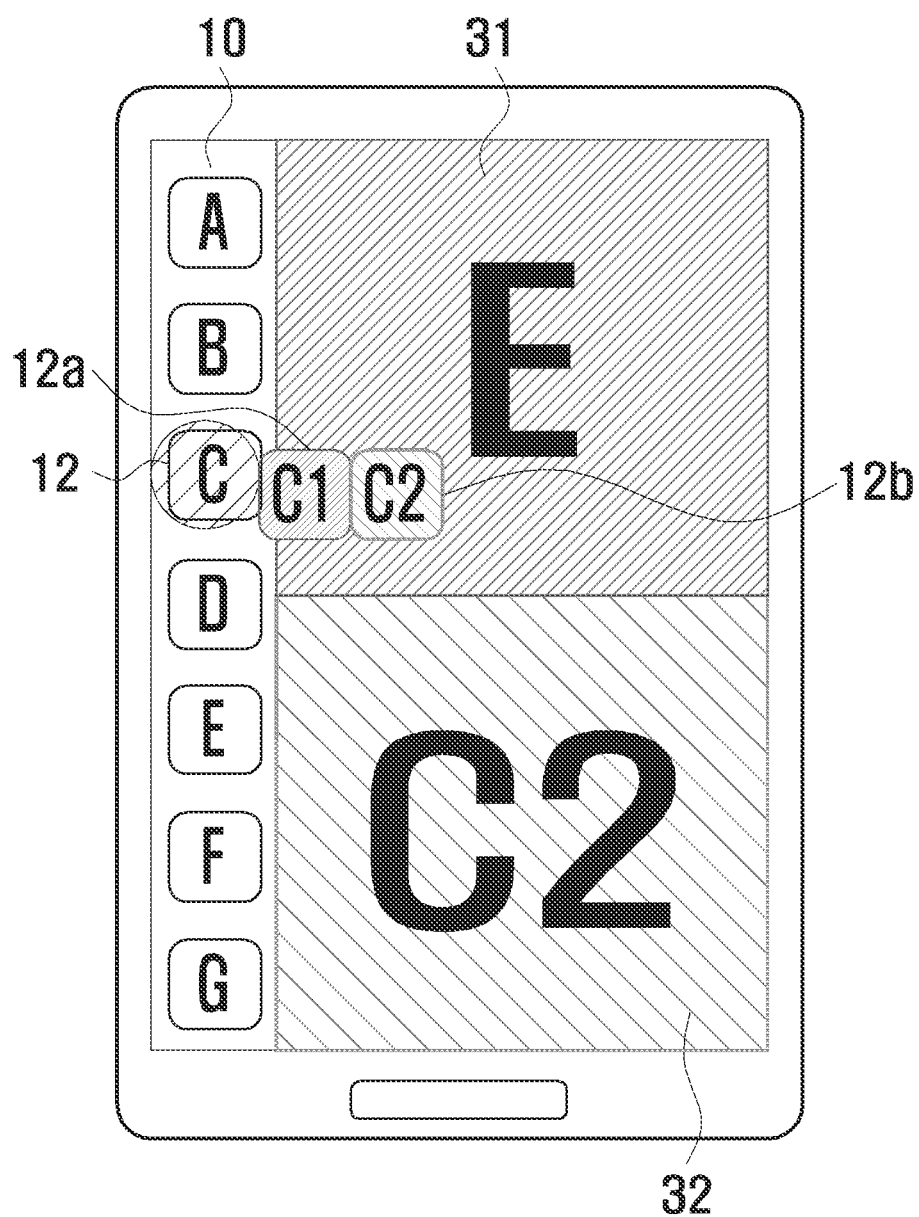
Figure 8C:
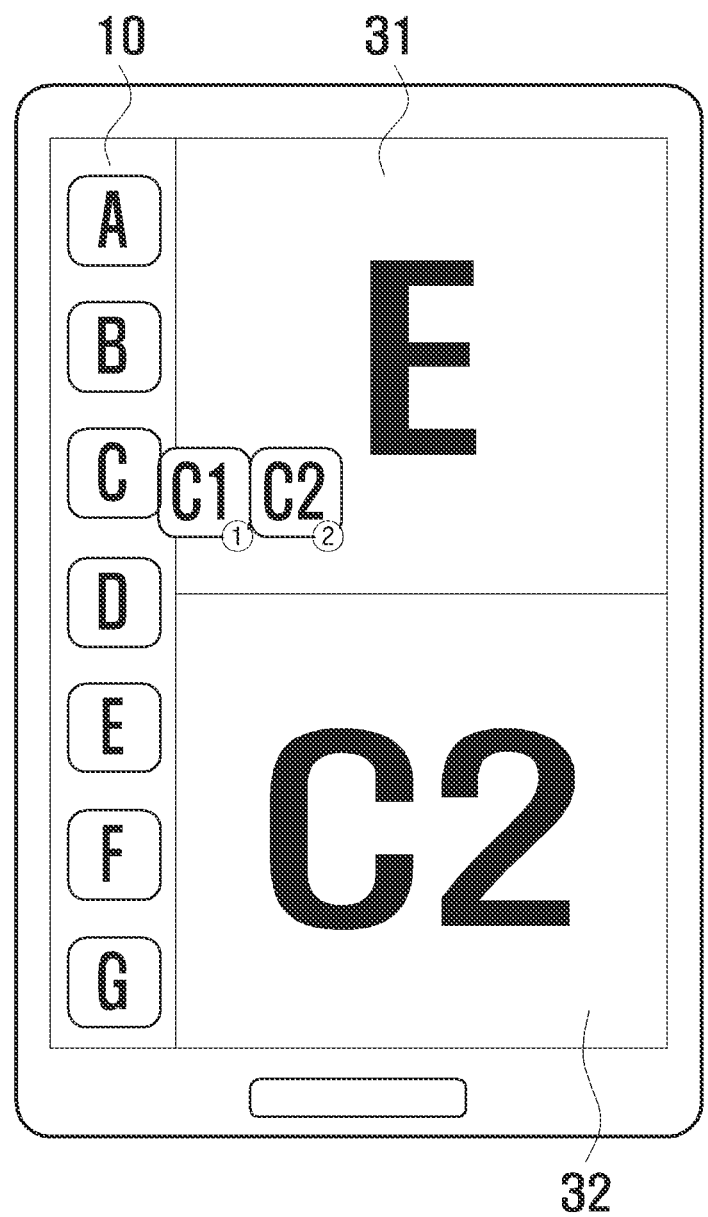
Figure 8D:
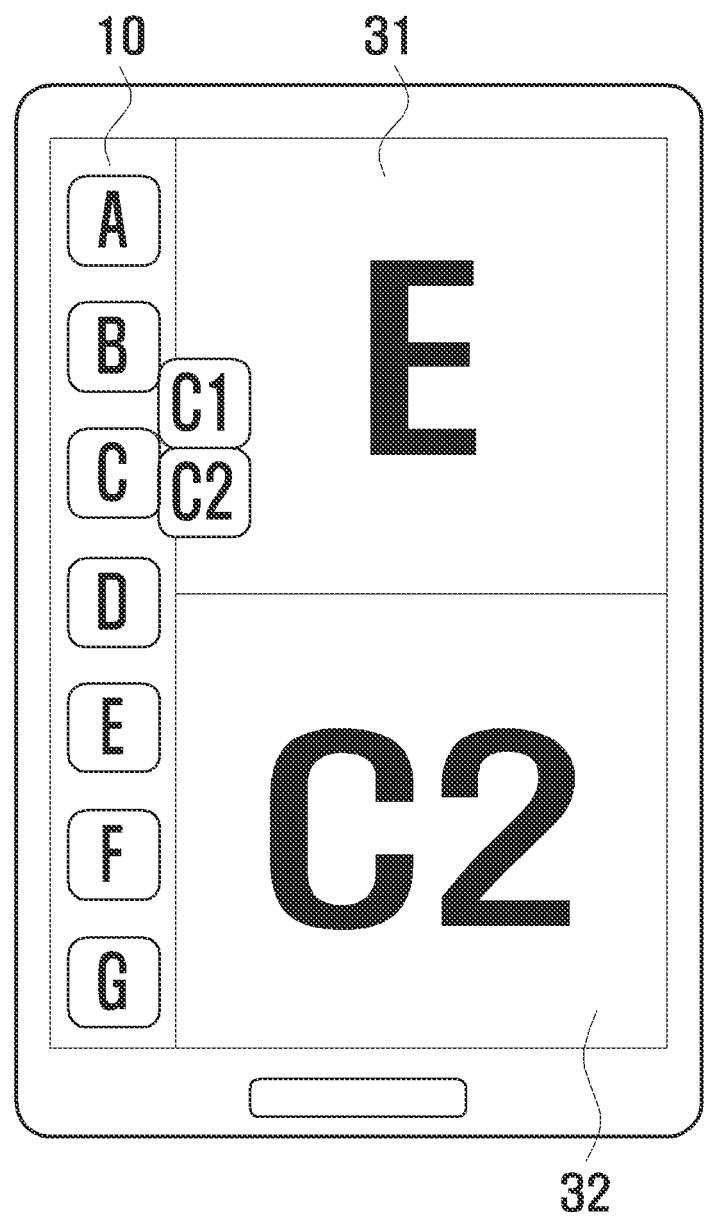

According to various embodiments of the present disclosure, the same application may be executed several times in another window. For example, as illustrated in FIGS. 8B to 8D, the application C may be executed in the first split window 31 and the second split window 32 respectively. In this case, when the second icon 12 corresponding to the application C is selected in the application tray 10 (e.g., in response to detection of selection of the second icon 12), the controller 110 may visually provide the execution state of the application C to the user. For example, as illustrated in FIG. 8B, the controller 110 may identically display at least part (e.g., an edge, a background color, and/or the like) of the first split window 31 and an icon 12a of application C1 being executed in the first split window 31 as a first color, and may identically display at least part of the second split window 32 and an icon 12b of application C2 being executed in the second split window 32 as a second color. In this case, a user may recognize the execution state of application through a color.

Alternatively, as illustrated in FIG. 8C, the controller 110 may display an identification code (e.g., a number) at one side of icons C1 and C2 displayed in the application tray 10. In FIG. 8C, the number 1 displayed in the icon C1 may mean that application is being executed in the first split window 31, and the number 2 displayed in the icon C2 may mean that application is being executed in the second split window 32. In this case, a user may recognize the execution state of application through the identification code (e.g., a number) displayed on the icon.

Alternatively, as illustrated in FIG. 8D, the controller 110 may arrange icons C1 and C2 vertically. This may mean that application C1 is being executed in the first split window 31, and application C2 is being executed in the second split window 32. In this case, the user may recognize the execution state of the application through a relative location (arrangement) of icons C1 and C2. Meanwhile, although not shown in a drawing, when the icon (e.g., C1) is selected in FIGS. 8B to 8D, the controller 110 may display the execution screen of the application corresponding to the selected icon (C1) on the first split window 31.

According to various embodiments of the present disclosure, when selecting the icon in the application tray 10 (e.g., in response to detection of the selection of the icon), the controller 110 may simultaneously display the icon of the applications being executed in the window in which the selected icon is executed.

Figure 8E:
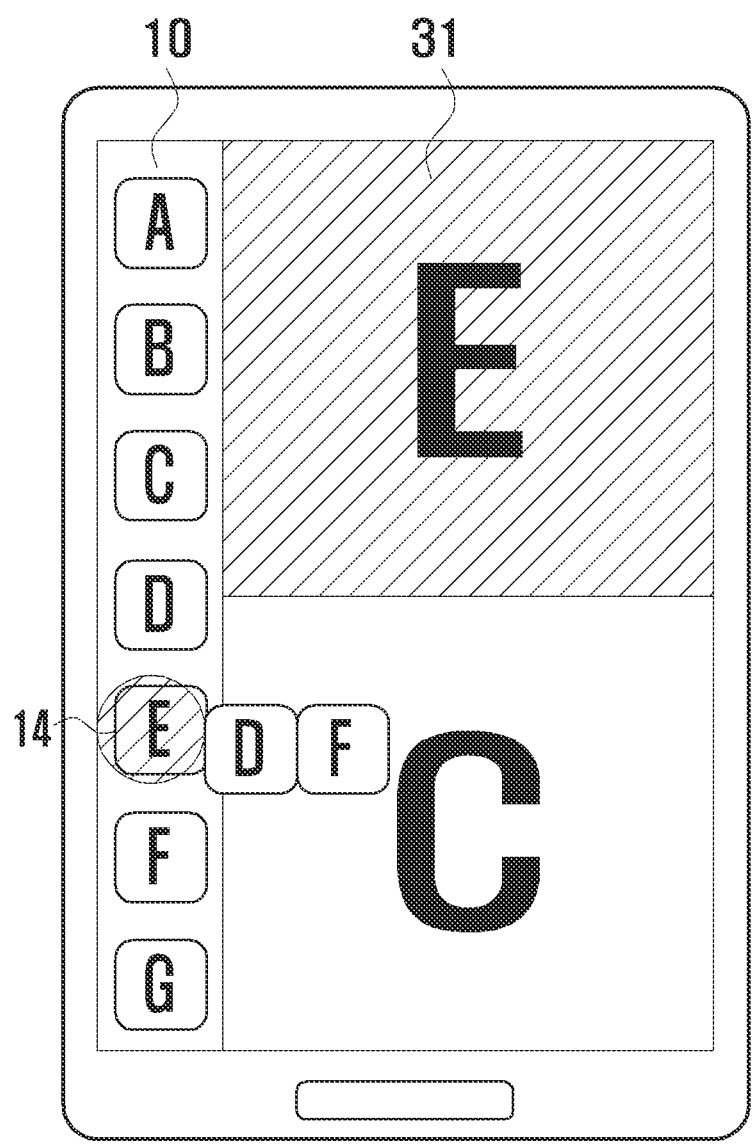

For example, when a fourth icon 14 is selected in the application tray 10 (e.g., in response to detection of selection of the fourth icon 14), as shown in FIG. 8E, the controller 110 may display the icon of the applications being executed in the first split window 31 in which the application corresponding to the fourth icon 14 is executed.

In this case, the controller 110 may visually differently display the first split window 31 in which the application corresponding to the fourth icon 14 is executed. The visually different display is to notify a user of a state in which the application corresponding to the fourth icon 14 is executed in the first split window 31. For example, referring to FIG. 8E, it can be recognized that applications D, E and F are being executed in the first split window 31. Meanwhile, although not shown, when a specific icon (e.g., F) is selected in a state in which a plurality of icons are displayed (e.g., in response to detection of selection of the specific icon), the controller 110 may display execution screen of application corresponding to the selected specific icon (F) on the first split window 31.

Figure 9:
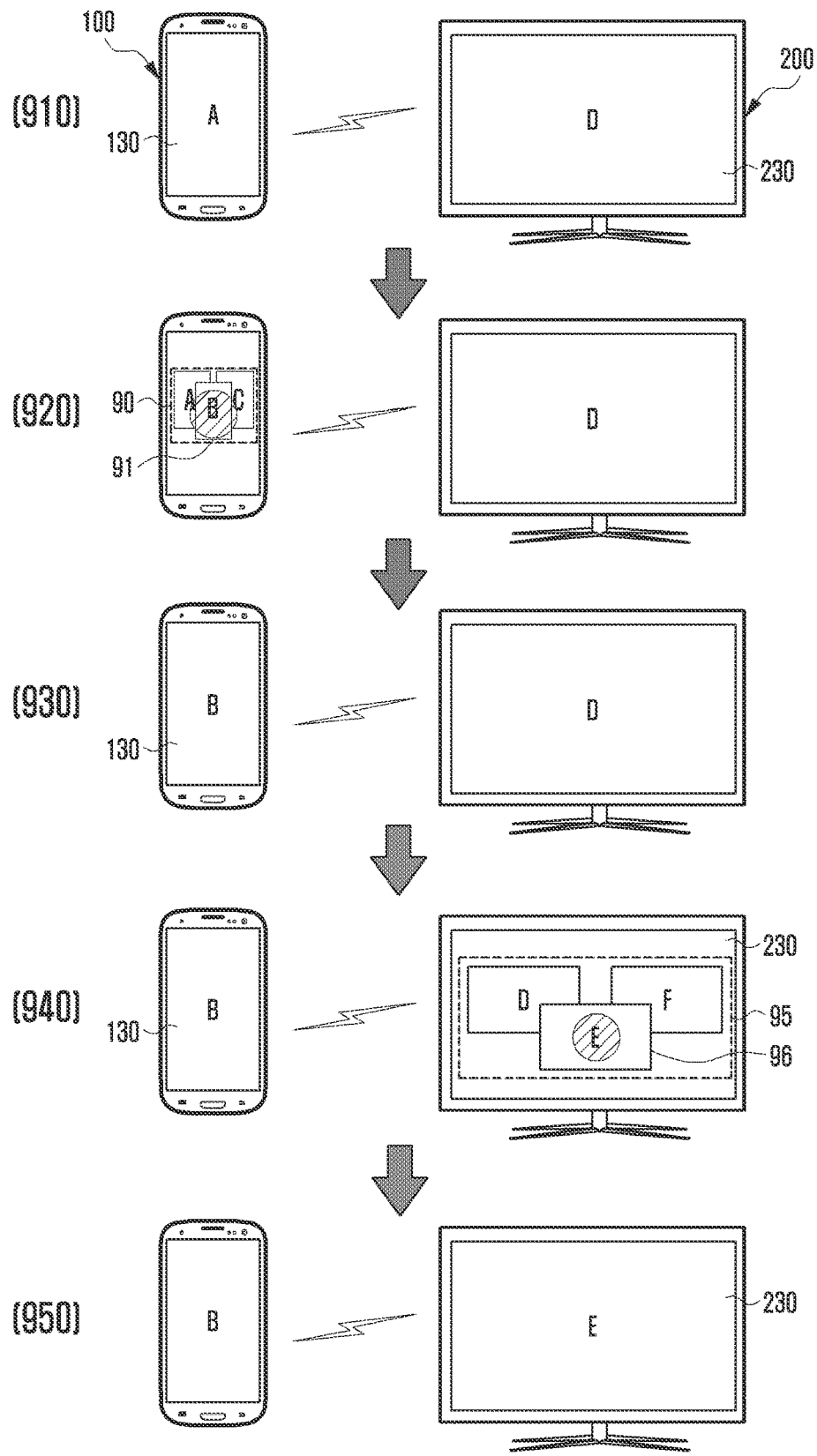
FIG. 9 is a diagram of screen illustrating a method of changing a screen of an electronic device according to various embodiments of the present disclosure.

FIG. 9 is a diagram of screen illustrating a method of changing a screen of an electronic device according to various embodiments of the present disclosure.

Referring to FIG. 9, according to various embodiments of the present disclosure, the controller 110 may control a screen change operation in a multi-window mode in which the electronic device 100 is wirelessly connected to a display apparatus 200. The display apparatus 200 may be an electronic device, and may include, for example, a tablet PC, a monitor, a digital TV, notebook PC, and/or the like.

The controller 110 may control, as shown in a drawing of reference numeral 910, to display the execution screen of the application A through the display unit 130 of the electronic device 100, and to display the execution screen of the application D through a display unit 230 of the display apparatus 200. The electronic device 100 may be assumed to execute applications B and C as a background operation, and the display apparatus 200 may be assumed to execute applications E and F as a background operation.

In the drawing of reference numeral 910, when a task change event is detected in a state in which the electronic device 100 is selected (e.g., focused) (e.g., in response to detection of the task change event), as shown in a drawing of reference numeral 920, the controller 110 may display a list 90 of applications being executed in the electronic device 100. When a thumbnail image 91 corresponding to the application B is selected from the list 90 (e.g., in response to selection of the thumbnail image 91), as shown in a drawing of reference numeral 920, the controller 110 may display the execution screen of the application B on the display unit 130 of the electronic device 100, as shown in a drawing of reference numeral 930.

In the meantime, when the task change event is detected in a state in which the display apparatus 200 is selected (e.g., focused) (e.g., in response to detection of the task change event), as shown in a drawing of reference numeral 940, the controller 110 may display a list 95 of applications being executed in a display unit 230 of the display apparatus 200. It is illustrated that the list 95 is displayed on the display apparatus 200. However, when the display apparatus 200 does not have a separate input device, the list 95 may be displayed on the display unit 130 of the electronic device 100.

When a thumbnail image 96 corresponding to the application E from the list 95 is selected (e.g., in response to detection of selection of the thumbnail 96), as shown in a drawing of reference numeral 950, the controller 110 may display the execution screen of the application E on the display unit 230 of the display apparatus 200. In the meantime, FIG. 9 illustrates that the electronic device 100 is wirelessly connected to the display apparatus 200. However, various embodiments of the present disclosure are not limited thereto. For example, the electronic device 100 and the display apparatus 200 may be connected in wired.

The method for changing a screen in an electronic device according to an embodiment of the present disclosure may be implemented in a program command form executable by various computer means and be recorded in a non-transitory computer readable recording medium. In this case, the non-transitory computer readable recording medium may include a program command, a data file, a data structure individually, the like, or a combination thereof. In the meantime, the program command recorded in a non-transitory computer-readable recording medium may be specially designed or configured for the present disclosure or be known to a person having ordinary skill in a computer software field to be used. The non-transitory computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM. RAM, or flash memory for storing and executing program commands. Further, the program command includes a machine language code created by a compiler and a high-level language code executable by a computer using an interpreter. The foregoing hardware device may be configured to be operated according to at least one software module to perform an operation of the present disclosure.

As described above, the method and apparatus for changing a screen in an electronic device according to various embodiments of the present disclosure may provide an application which is being executed for each window without providing all applications being executed, when a screen change is requested, thereby improving the user's convenience.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A portable communication device comprising:
a touchscreen display; and
a processor configured to:
display, via the touchscreen display, a first window and a second window concurrently such that a first execution screen corresponding to a first application is displayed in substantially an entire area of the first window, and that a second execution screen corresponding to a second application is displayed in substantially an entire area of the second window,
receive a first touch input via the touchscreen display while the first execution screen and the second execution screen are displayed in the first window and the second window, respectively,
in response to the first touch input, display a first icon indicative of a third application and a second icon indicative of a fourth application as overlapping with the first execution screen displayed in the first window or the second execution screen displayed in the second window,
receive a second touch input with respect to the first icon while the first icon and the second icon are displayed as overlapping with the first execution screen displayed in the first window or the second execution screen displayed in the second window,
in response to the second touch input, display a third window within the first window such that a third execution screen corresponding to the third application is displayed in substantially an entire area of the third window,
receive a third touch input with respect to the second icon while the first execution screen, the second execution screen and the third execution screen are displayed concurrently in the first window, the second window and the third window, respectively,
in response to the third touch input, replace, in the third window, the third execution screen with a fourth execution screen corresponding to the fourth application while the first execution screen, the second execution screen and the third execution screen are displayed concurrently in the first window, the second window and the third window, respectively,
receive a fourth touch input with respect to the third window while the first execution screen, the second execution screen and the fourth execution screen are displayed concurrently in the first window, the second window and the third window, respectively,
in response to the fourth touch input, display a first indication and a second indication concurrently within the third window, the first indication indicative of the third execution screen previously displayed in the third window, and the second indication indicative of the fourth execution screen previously displayed in the third window,
receive a fifth touch input to select the first indication or the second indication while the first execution screen, the second execution screen and the first and the second indications are displayed concurrently, and
in response to the fifth touch input to select the first indication or the second indication, display a corresponding execution screen of the third execution screen or the fourth execution screen, respectively, in the third window.

2. The portable communication device of claim 1,
wherein the first indication includes a first image corresponding to and smaller than the third execution screen, and the second indication includes a second image corresponding to and smaller than the fourth execution screen, and
wherein the processor is further configured to:
display a portion of the second image as overlapping with a portion of the first image.

3. The portable communication device of claim 1, wherein the processor is further configured to:
perform the displaying of the first indication and the second indication such that the first indication includes a first name indicative of the third application and a first thumbnail image corresponding to the third execution screen, and that the second indication includes a second name indicative of fourth application and a second thumbnail image corresponding to the fourth execution screen.

4. The portable communication device of claim 1, wherein the processor is further configured to:
perform the displaying of the third window such that the third window including the third execution screen is presented as a pop-up box.

5. The portable communication device of claim 1, wherein the processor is further configured to:
refrain from displaying the first indication or the second indication while the corresponding execution screen is displayed in response to the fifth touch input.

6. The portable communication device of claim 1, wherein the processor is further configured to:
receive a touch input for displaying an icon display area, the icon display area including a plurality of executions icons that each correspond to a respective application while the first execution screen and the second execution screen are displayed in the first window and the second window, respectively, and
based on receiving the touch input for displaying the icon display area, display the icon display area over the first execution screen displayed in the first window or the second execution screen displayed in the second window.

7. The portable communication device of claim 1, wherein the first window and the second window comprise a partitioning of substantially an entire region of the touchscreen display.

8. The portable communication device of claim 7, wherein the processor is further configured to display the first window and the second window adjacent to each other having substantially equal shape.

9. The portable communication device of claim 7, wherein the processor is further configured to display the first window and the second window as a pop-up window, respectively.

10. The portable communication device of claim 9, wherein the processor is further configured to display the first window and the second window in partial overlap.

11. A method of a portable communication device comprising a touchscreen display, the method comprising:
displaying, via the touchscreen display, a first window and a second window concurrently such that a first execution screen corresponding to a first application is displayed in substantially an entire area of the first window, and that a second execution screen corresponding to a second application is displayed in substantially an entire area of the second window;
receiving a first touch input via the touchscreen display while the first execution screen and the second execution screen are displayed in the first window and the second window, respectively;
in response to the first touch input, displaying a first icon indicative of a third application and a second icon indicative of a fourth application as overlapping with the first execution screen displayed in the first window or the second execution screen displayed in the second window;
receiving a second touch input with respect to the first icon while the first icon and the second icon are displayed as overlapping with the first execution screen displayed in the first window or the second execution screen displayed in the second window;
in response to the second touch input, displaying a third window within the first window such that a third execution screen corresponding to the third application is displayed in substantially an entire area of the third window;
receiving a third touch input with respect to the second icon while the first execution screen, the second execution screen and the third execution screen are displayed concurrently in the first window, the second window and the third window, respectively;
in response to the third touch input, replacing, in the third window, the third execution screen with a fourth execution screen corresponding to the fourth application while the first execution screen, the second execution screen and the third execution screen are displayed concurrently in the first window, the second window and the third window, respectively;
receiving a fourth touch input with respect to the third window while the first execution screen, the second execution screen and the fourth execution screen are displayed concurrently in the first window, the second window and the third window, respectively;
in response to the fourth touch input, displaying a first indication and a second indication concurrently within the third window, the first indication indicative of the third execution screen previously displayed in the third window, and the second indication indicative of the fourth execution screen previously displayed in the third window;
receiving a fifth touch input to select the first indication or the second indication while the first execution screen, the second execution screen and the first and the second indications are displayed concurrently; and
in response to the fifth touch input to select the first indication or the second indication, displaying a corresponding execution screen of the third execution screen or the fourth execution screen, respectively, in the third window.

12. The method of claim 11,
wherein the first indication includes a first image corresponding to and smaller than the third execution screen, and the second indication includes a second image corresponding to and smaller than the fourth execution screen, and
wherein the method further comprises:
displaying a portion of the second image as overlapping with a portion of the first image.

13. The method of claim 11, wherein the displaying of the first indication and the second indication comprises:
performing the displaying of the first indication and the second indication such that the first indication includes a first name indicative of the third application and a first thumbnail image corresponding to the third execution screen, and that the second indication includes a second name indicative of fourth application and a second thumbnail image corresponding to the fourth execution screen.

14. The method of claim 11, wherein the displaying of the third window comprises:
performing the displaying of the third window such that the third window including the third execution screen is presented as a pop-up box.

15. The method of claim 11, further comprising:
refraining from displaying the first indication or the second indication while the corresponding execution screen is displayed in response to the fifth touch input.

16. The method of claim 11, further comprising:
receiving a touch input for displaying an icon display area, the icon display area including a plurality of executions icons that each correspond to a respective application while the first execution screen and the second execution screen are displayed in the first window and the second window, respectively; and
based on receiving the touch input for displaying the icon display area, displaying the icon display area over the first execution screen displayed in the first window or the second execution screen displayed in the second window.

17. The method of claim 11, wherein the first window and the second window comprise a partitioning of substantially an entire region of the touchscreen display.

18. The method of claim 17, further comprising:
displaying the first window and the second window adjacent to each other having substantially equal shape.

19. The method of claim 17, further comprising:
displaying the first window and the second window as a pop-up window, respectively.

20. The method of claim 19, further comprising:
displaying the first window and the second window in partial overlap.

21. A portable communication device comprising:
a touchscreen display; and
a processor configured to:
display, via the touchscreen display, a first window and a second window concurrently such that a first execution screen corresponding to a first application is displayed in substantially an entire area of the first window, and that a second execution screen corresponding to a second application is displayed in substantially an entire area of the second window,
receive a first touch input via the touchscreen display while the first execution screen and the second execution screen are displayed in the first window and the second window, respectively,
in response to the first touch input, display a first icon indicative of a third application and a second icon indicative of a fourth application as overlapping with at least one execution screen of the first execution screen displayed in the first window or the second execution screen displayed in the second window,
receive a second touch input with respect to the first icon while the first icon and the second icon are displayed as overlapping with the at least one execution screen,
in response to the second touch input, display a third window within the first window such that a third execution screen corresponding to the third application is displayed in substantially an entire area of the third window,
receive a third touch input with respect to the second icon while the first execution screen, the second execution screen and the third execution screen are displayed concurrently in the first window, the second window and the third window, respectively,
in response to the third touch input, replace, in the third window, the third execution screen with a fourth execution screen corresponding to the fourth application while the first execution screen, the second execution screen and the third execution screen are displayed concurrently in the first window, the second window and the third window, respectively,
receive a fourth touch input with respect to the third window while the first execution screen, the second execution screen and the fourth execution screen are displayed concurrently in the first window, the second window and the third window, respectively,
in response to the fourth touch input, concurrently display within the third window a set of indications for identifying and changing execution screens in the third window, the set of indications comprising indications only corresponding to applications previously executed in the third window, the set of indications including a first indication indicative of the third execution screen and a second indication indicative of the fourth execution screen,
receive a fifth touch input to select the first indication or the second indication while the first execution screen, the second execution screen, and the first and the second indications are displayed concurrently, and
in response to the fifth touch input to select the first indication or the second indication, display a corresponding execution screen of the third execution screen or the fourth execution screen, respectively, in the third window with the first execution screen in the first window and the second execution screen in the second window.

* * * * *

UNITED STATES PATENT AND TRADEMARK OFFICE
CERTIFICATE OF CORRECTION

| | | |
|---|---|---|
| PATENT NO. | : 11,687,214 B2 | Page 1 of 1 |
| APPLICATION NO. | : 17/476974 | |
| DATED | : June 27, 2023 | |
| INVENTOR(S) | : Hyeongseop Shim et al. | |

It is certified that error appears in the above-identified patent and that said Letters Patent is hereby corrected as shown below:

On the Title Page

The missing foreign priority information should be added as:
-- (30) Foreign Application Priority Data
August 30, 2013 (KR) 10-2013-0104431 --.

Signed and Sealed this
First Day of August, 2023

Katherine Kelly Vidal
*Director of the United States Patent and Trademark Office*